Nov. 15, 1966  J. R. CLARKSON  3,285,563
SCREW ACTUATED PINCH VALVE
Filed Nov. 8, 1962  2 Sheets-Sheet 1
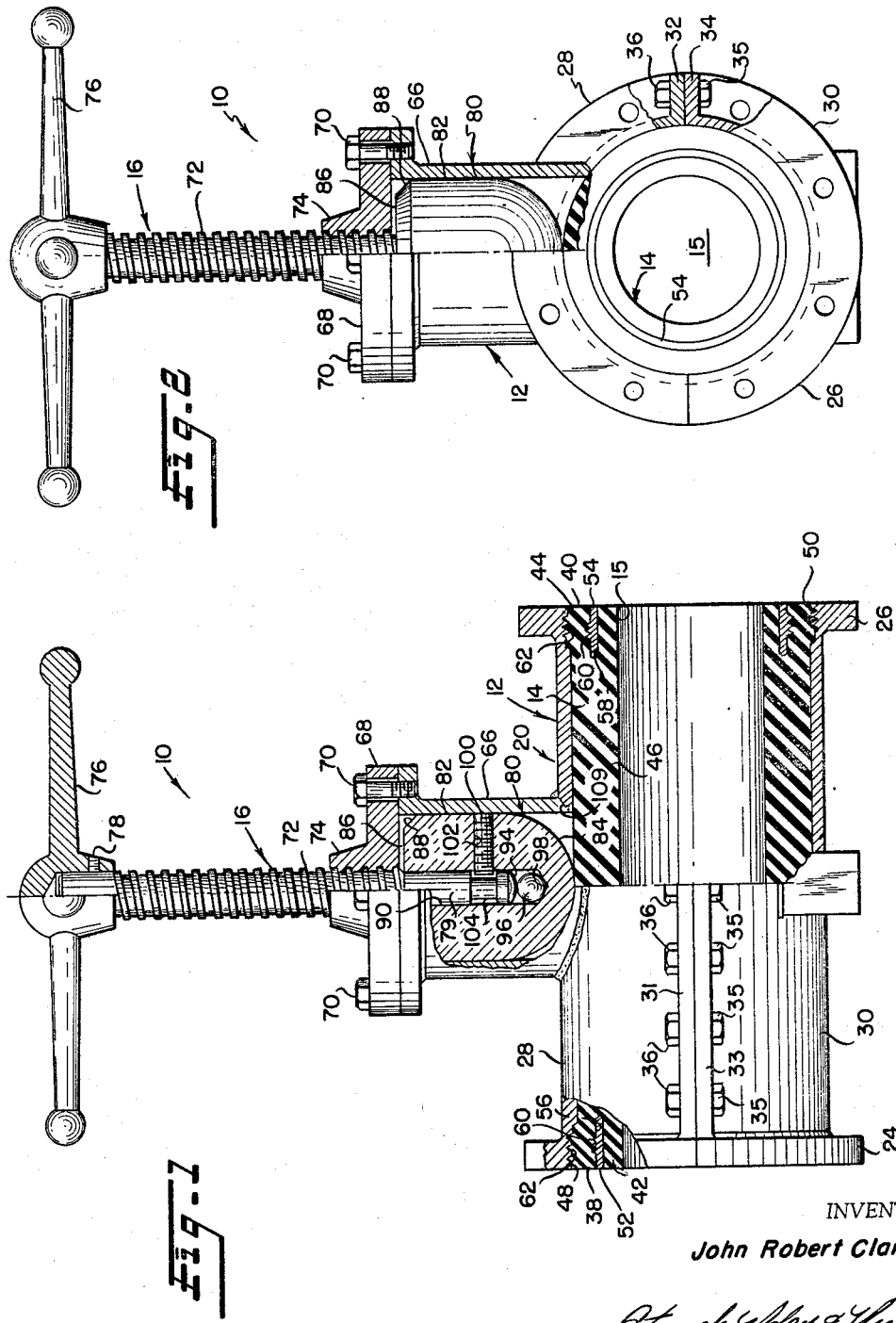
INVENTOR
John Robert Clarkson
BY
ATTORNEYS

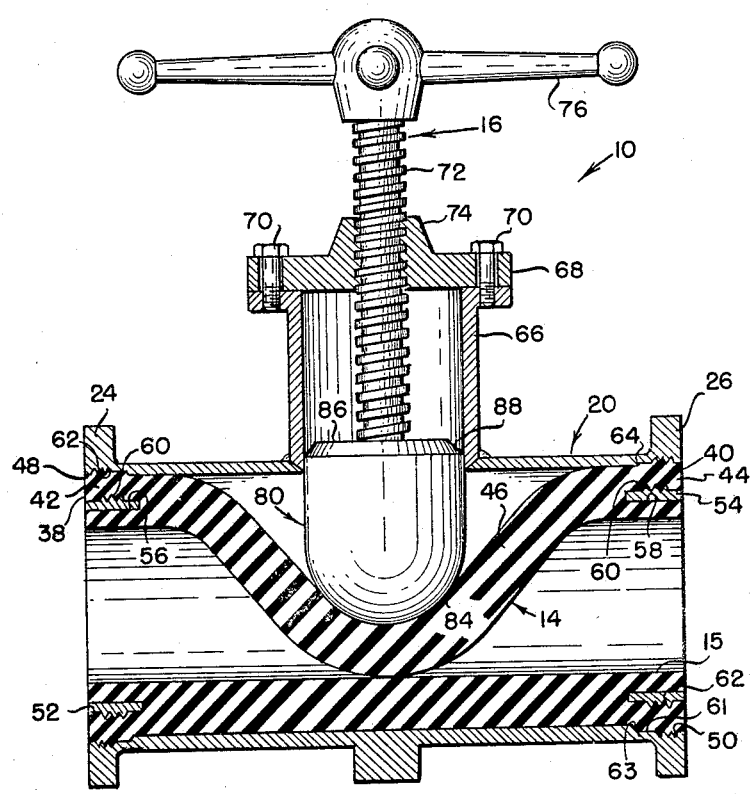
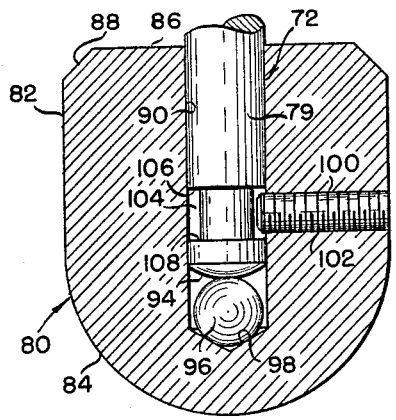

United States Patent Office 3,285,563
Patented Nov. 15, 1966

3,285,563
SCREW ACTUATED PINCH VALVE
John Robert Clarkson, Palo Alto, Calif., assignor to The
J. R. Clarkson Company, Palo Alto, Calif., a corporation of California
Filed Nov. 8, 1962, Ser. No. 236,214
7 Claims. (Cl. 251—8)

The present invention relates to valves and more particularly to improvements in sleeve-type valves having an unobstructed fluid passage formed by an internal sleeve which is constructable to vary the cross section of and thereby control the flow of fluid through the fluid passage.

Sleeve valves of the type with which the present invention is concerned are especially adapted for controlling the flow of abrasive or corrosive fluids containing suspended solids usually in pulp or slurry form. The metallic valve parts subject to damage by such abrasive or corrosive fluids are protected by the sleeve which prevents the abrasive or corrosive fluid stream from contacting other components of the valve. To control the flow of fluid through the fluid passage formed by the sleeve, the sleeve is made sufficiently flexible to permit it to be squeezed or pinched by a valve closure member disposed exteriorly of the sleeve and adapted to be displaced radially of the sleeve longitudinal axis by a valve actuator.

Prior sleeve valve constructions typically employ one of two types of valve actuators: a pivoted actuating lever or a threaded valve stem operator. The pivoted lever type of valve actuating mechanisms usually are limited to conditions requiring the valve only to be in fully opened or fully closed positions and are not satisfactory for effectively throttling the flow of fluid. As a result, where fine throttling adjustments are desired, a threaded valve stem or screw type operator is required. For making such throttling adjustments the rising stem type of valve operator is often preferred over the type of threaded valve operating which is axially fixed, since the position of the valve closure member can be easily determined by observation of the length of the stem projecting out of the valve body.

One of the chief disadvantages of prior art sleeve valve constructions employing threaded stem actuators is the high magnitude of torque required to be applied to the valve actuating stem under certain conditions to turn the stem towards a valve closed position. This relatively high torque that must be applied to turn the stem is attributable to a number of factors. For example, with prior constructions particularly employing a rising valve stem, line fluid pressure applies a force to the valve closure member tending to displace the closure member laterally with respect to the rotational axis of the valve stem. As a result, a force is applied to the inner end of the threaded valve stem tending to pivot the stem about an axis extending normal to its rotational axis. When the stem is slightly canted or pivoted in this manner, binding and resultant galling of the stem threads is likely to occur which consequently gives rise to the necessity of applying a greater torque for turning the stem.

This objectionable condition is especially prevalent with prior sleeve valves having ball shaped valve closure members wherein the ball is out of supporting contact with the valve body in fully and partially valve closed positions.

In addition, with the rising stem type of sleeve valve actuator, sufficient torque is required to turn the operating stem in order to overcome a resistive force produced by the frictional engagement of the valve closure member with the periphery of the valve sleeve. The resistance which this frictional force offers is particularly intensified in prior art constructions where the valve closure member is non-rotatably carried by the valve stem or is frictionally held between the sleeve and a seating element on the stem so that it will tend to turn with the valve stem as if it were fixed thereto. This frictional resistance to turning the stem is further heightened when attempting to move the valve closure member to closed position against relatively high line fluid pressures which act on the interior of the valve sleeve to exert an additional friction-intensifying force on the valve closure member.

A further factor contributing to the high application of torque especially in sleeve valve constructions where the closure member is not carried by the stem operator to permit relative rotation between the stem and the closure member is the frictional resistance occasioned by the abutting engagement of the closure member with the stem operator.

Another difficulty experienced with previously available sleeve valves is in fixedly retaining of the inner sleeve in place without impairing the ability of the sleeve to deform readily under the action of the valve closure member and also without impairing the ready replacement of the sleeve in service. This problem becomes particularly serious where the valve is required to have pipe coupling flanges and where threaded couplings or other various types of conventional clamping adapters cannot be employed to retain the sleeve due to high pressure service or the size of the valve.

The present invention has as its primary object the provision of a novel sleeve-type valve which is not subject to the foregoing disadvantages encountered with prior sleeve valve constructions.

More specifically it is the object of the present invention to provide for a novel sleeve valve having a threaded stem actuator which is easily operated with low application of torque.

Another and more specific object of the present invention resides in the provision of a novel sleeve-type valve having a threaded rising valve stem actuator specially constructed to allow the valve stem to turn relative to the valve closure member to thereby substantially eliminate the application of additional torque for overcoming objectionable frictional forces resulting from the engagement of the valve closure member with the exterior surface of the valve sleeve.

Still another object of the present invention resides in the provision of a novel elastic sleeve-type valve having a specially constructed threaded valve stem operator in which the valve closure member is continuously guided in the valve body to effectively resist the tendency of line fluid pressure to cant the valve operating stem.

Another object of the present invention resides in the provision of a sleeve-type valve having a novel threaded stem valve operator in which the area of bearing engagement between the valve stem and valve closure member is minimized to reduce the frictional forces resisting rotation of the stem.

A further object of the present invention resides in the provision of a sleeve type valve having a novel threaded valve stem actuator in which the valve closure member is maintained coaxially in alignment with the valve stem regardless of fluid pressure forces exerted on the closure member.

A further object of the present invention is to provide a novel sleeve-type valve having an elastic flow control sleeve which is securely retained in position but which is easily and quickly removable and replaceable.

More specifically it is the object of the present invention to provide for a novel sleeve-type valve having a flangeless elastic flow control sleeve which is enclosed in a flanged valve body and which is grippingly fixed at opposite ends to the valve body without the need of conventional pipe nipples, couplings, clamping devices or the like.

Still a further object of the present invention resides in the provision of a novel sleeve-type valve which is easy to install in pipeline and which affords leak-proof pipe connections to prevent the escape of pipeline fluid to the surrounding region exteriorly of the valve and piping.

Further objects of the invention will appear as the description proceeds in connection with the appended claims and the annexed drawings wherein:

FIGURE 1 is a partially section side elevational view of an elastic sleeve valve according to one embodiment of the present invention;

FIGURE 2 is a partially sectioned right-hand end elevational view of the sleeve valve illustrated in FIGURE 1 with the valve casing partially broken away to show interior details;

FIGURE 3 is a longitudinal sectional view similar to FIGURE 1 but showing the valve components in valve closed position; and FIGURE 4 is an enlarged fragmentary sectional view of the valve operator illustrated in FIGURES 1–3.

Referring now to FIGURES 1–3, the reference numeral 10 generally designates an elastic sleeve valve embodying the principles of the present invention. The principal components of valve 10 include a rigid valve housing 12 preferably made of metal, a thick walled elastic flow control sleeve 14 mounted in housing 12 and forming an unobstructed straight flow passage 15 through housing 12, and a valve stem operator assembly 16 manipulatable to transversely constrict sleeve 14, thereby varying the fluid flow cross section of passage 15. Sleeve 14 is made from flexible elastic gum rubber or like synthetic rubber material having good memory characteristics enabling the sleeve to resume its natural undeformed cylindrical shape after it has been constricted. Gum rubber is especially preferred because of its resistance to corrosion and abrasion and capability of undergoing repeated constrictions without structural failure.

Housing 12 comprises a hollow cylindrically shaped longitudinally split valve body 20 concentrically encircling sleeve 14 and terminating at opposite ends in radially extending pipe attachment flanges 24 and 26. Body 20 is formed by two cast metal mating body sections 28 and 30 each of semi-circular cross section and abutting each other along an interface contained in a plane diametrically passing through the longitudinal axis of sleeve 14. Body section 28 is provided on opposite sides with diametrically opposed clamping flanges 31 (FIGURE 1) and 32 (FIGURE 2) which project radially outwardly and extend the entire longitudinal length between flanges 24 and 26. Body section 30 is formed with a corresponding pair of diametrically opposed radially projecting flanges 33 (FIGURE 1) and 34 (FIGURE 2) which respectively extend coextensive with and matingly abut flanges 31 and 32 along the interface between sections 28 and 30.

Body section 30 is detachably secured to body section 28 as by nuts 35 threaded on bolts 36 which extend through each of the two pairs of abuting flanges 31, 33 and 32, 34. With this valve body construction, it will be appreciated that sleeve 14 is easily and readily removable from valve body 20 by unclamping section 30 from section 28.

With continued reference to FIGURES 1–3, sleeve 14, which has a uniform inside diameter, extends from one end of valve body 20 to the other end and is formed with oppositely directed planar end faces 30 and 40 which are respectively flush with flat oppositely directed end faces formed on flanges 24 and 26. End faces 38 and 40 are contained substantially in parallel planes respectively passing through the end faces of flanges 24 and 26 and extending at right angles of the axis of sleeve 14.

By extending sleeve 14 from one end of valve body 12 to the other in this manner, sleeve 14 protects the other components of valve 10 from exposure to fluid delivered from a pipeline or tubing string (not shown) connected to valve 10. Also, by terminating sleeve 14 flush with the oppositely facing end surfaces of flanges 24 and 26, no portion of sleeve 14 will be clamped between either of the flanges 24 and 26 and the mating pipe coupling flanges (not shown). As a result, the gasketing (not shown) adapted to be interposed between the valve flanges 24 and 26 and the mating pipe coupling flanges (not shown) on the attaching pipe (not shown) is separate and independent of sleeve 14. This permits the selection of a wide variety of gasket materials without limitation to the characteristics which the material forming sleeve 14 is required to prossess. Consequently, the most appropriate gasket material for preventing leakage and withstanding the high flange exerted compression forces may be selected at minimal expense.

As best shown in FIGURES 1 and 3, sleeve 14 is formed with longitudinally spaced enlarged identically shaped end portions 42 and 44 disposed radially inwardly of flanges 24 and 26 respectively and integrally joined together by an intermediate portion 46. End portions 42 and 44 are respectively seated in oppositely facing counterbored end recesses 48 and 50 formed in valve body 20 and opening axially outwardly in coaxial relationship with the longitudinal axis of body 20. Intermediate portion 46 is formed with a uniform outside diameter which is somewhat less than the outside diameters of end portions 42 and 44.

To fixedly secure sleeve 14 in position within valve body 20, two thin rigid annular retaining rings 52 and 54 are respectively snugly received with a press fit in outwardly opening axially extending annular grooves 56 and 58. Grooves 56 and 58 are respectively formed inwardly of end faces 38 and 40 of sleeve 14 approximately midway between the exterior and interior cylindrical surfaces of the sleeve and in coaxial relationship with the sleeve longitudinal axis. Retainer rings 52 and 54 respectively extend substantially the entire axial length of recesses 48 and 50 and terminate in flat axially directed end faces which are substantially flush with the smooth flat sleeve end faces 38 and 40.

With continued reference to FIGURES 1–3, retainer rings 52 and 54 are of identical construction with each ring having a serrated region disposed centrally between its opposite ends and providing a plurality of axially spaced radially outwardly projecting annular gripping ribs 60. Ribs 60 have uniform V-shaped cross sections with correspondingly outwardly opening V-shaped annular grooves being formed adjacently disposed ribs. Ribs 60 grip sleeve 14 thereby securely retaining rings 52 and 54 axially in place.

By insertion of retaining rings 52 and 54 into their respective sleeve grooves 56 and 58, the ends of sleeve 14 are flared outwardly into recesses 48 and 50 which are each formed with an internal cylindrical periphery 61. The cylindrical periphery 61 of each of the recesses 48 and 50 is formed with a serrated region substantially radially aligned with ribs 60 and providing a plurality of inwardly opening axially spaced annular V-shaped grooves 62. End portions 42 and 44 of sleeve 14 are respectively wedged by rings 52 and 54 into snug fluid tight engagement with the cylindrical peripheries 61 of recesses 48 and 50. The shape ridges formed between grooves 62 thus grip the enlarged end portions 42 and 44 of sleeve 14 and establish an interlock thereby assuring the retention of sleeve 14 and preventing axial displacement thereof relative to body 20 during service and particularly when sleeve 14 is constricted by operator assembly 16.

With the foregoing sleeve and sleeve retention structure, sleeve 14 may be axially removed from housing 12 without requiring the removal of valve body section 30. In order to accomplish the removal of sleeve 14 in this manner, retainer rings 52 and 54 are first removed by wedgingly inserting a tool, such as a screw driver between each of the retainer rings 52 and 54 and the outer periphery of the grooves 56 and 58 in which rings 52 and 54 are respectively disposed to flex the ends of sleeve 14 and thereby work each of the rings 52 and 54 axially outwardly. After retainer rings 52 and 54 are removed, sleeve 14 may be pulled or pushed out of valve body 20. To make the removal of sleeve 14 easier, the outside diameter of the sleeve intermediate portion 46 is made slightly less than the inside diameter of the cylindrical portion of valve body 20 extending between recesses 48 and 50 thus eliminating any frictional resistance in this region of sleeve 14.

In axially removing sleeve 14 from valve body 20, one or the other of the sleeve end portions 42 and 44 will be pulled through the region of valve body 20 intermediate recesses 48 and 50 where the diameters of end portions 42 and 44 are normally slightly greater than the internal valve body diameter. This offers, however, only negligible frictional resistance particularly for small and intermediate valve sizes since the sleeve end portions 42 and 44 are readily radially compressed due to the provision of the annular grooves 56 and 58 for retainer rings 52 and 54.

As shown in FIGURES 1 and 3 each of the recesses 48 and 50 is delimited at its base by a slightly sloped axially outwardly facing annular shoulder 63 formed on valve body 20. Each of the enlarged end portions 42 and 44 of sleeve 14 is formed with a corresponding axially inwardly facing annular shoulder 64 which abuttingly engages with shoulder 63 when retainer rings 52 and 54 are inserted to flare the ends of sleeve 14 radially outwardly. This abutting engagement of shoulders 63 and 64 establishes a further interlock to prevent axial slippage of sleeve 14 particularly when constricted by valve operator assembly 16.

With continued reference to FIGURES 1-3, valve housing 12 comprises a hollow cylindrical bonnet 66 fixed, as by welding, to the upper valve body section 28 midway between flanges 24 and 26 along an axis perpendicularly intersecting the longitudinal axis of sleeve 14 and contained a plane passing normally through the interface between valve body sections 28 and 30. The upper end of bonnet 66 is flanged radially outwardly to mount a cap 68 by means of a series of circumferentially spaced machine screws indicated at 70. Valve operator assembly 16 comprises a threaded valve operating stem 72 threadedly extending through a central internally threaded hollow boss 74 formed in cap 68 in coaxial relationship with the longitudinal axis of bonnet 66. A manipulating handle 76 is fixedly secured to the upper end of valve stem 72 as by a set screw 78.

As shown in FIGURE 4, valve stem 72 is provided with an inner unthreaded cylindrical end section 79 projecting coaxially into the interior of bonnet 66 and mounting a valve closure member 80. Closure member 80 comprises a hemispherically bottomed cylinder having a smooth uniformly diametered cylindrical side wall surface 82 coaxially merging with a hemispherically shaped bottom surface 84 facing inwardly toward sleeve 14. The radius of surface 84 is equal to the radius of the cylindrical surface 82. The outwardly facing end of closure member 80 comprises a flat planar top surface 86 joined to cylindrical surface 82 by an upwardly converging frusto-conical surface 88. Surface 86 extends substantially at right angles to the longitudinal axis of closure member 80 and also to the rotational axis of stem 72.

Coaxially formed in closure member 80 is an outwardly opening cylindrically surfaced central bearing recess 90 which extends inwardly from top surface 86 and which interfittingly receives stem section 79 to accurately maintain member 80 coaxially aligned with stem 72. Recess 90 has a uniform diameter which is at least equal to the diameter of stem section 79 but which is normally and preferably slightly larger than the diameter of stem section 79 to provide a slight running clearance permitting stem 72 to turn relative to closure member 80. Stem end section 79 is preferably machine finished with a polished surface to preclude the occurrence of scoring or binding in this region. By providing this clearance fit, stem 72 can be easily turned relative to member 80, as will be explained in greater detail later on, without having to overcome the resistive force attributable to frictional engagement of closure member 80 with sleeve 14.

With continued reference to FIGURES 1-4, the inwardly facing end of stem section 79 is formed with a segmental spherical surface 94 abutting a thrust bearing 96. Thrust bearing 96 comprises a ball in point contact with stem surface 94 and seated in a suitable central socket 98 formed at the inner end of recess 90. Socket 98 centers bearing 96 coaxially in recess 90. With this thrust bearing and stem structure, the thrust bearing interface at the inner end of stem 72 is maintained at an absolute minimum to correspondingly minimize the resultant frictional force resisting rotation of the stem.

As shown in FIGURES 1 and 4, valve closure member 80 is axially retained on valve stem 72 by means of a set screw 100 which is threadedly received in an internally threaded bore 102 extending radially with respect to the longitudinal axis of stem 72 from the outer side wall surface of member 80 and opening into recess 90 approximately midway between the bottom of recess 90 and top surface 86. The outer end of screw 100 is completely received in bore 102 thus providing closure member 80 with a smooth exterior side wall surface for allowing free axial movement of member 80 in bonnet 66. The inner tip of screw 100 extends into recess 90 and projects freely into an outwardly opening cylindrically bottomed annular groove 104 formed in the periphery of stem section 79 near end face 94. The inner end of screw 100 is slightly spaced from the bottom of groove 104.

As best seen in FIGURE 4, groove 104 is formed with straight parallel radially extending side walls 106 and 108 adapted to be abuttingly engaged by screw 100 to axially retain closure member 80 on stem 72 but permitting rotation of stem 72 relative to member 80. Thus, stem 72 and closure member 80 are axially advanceable as a unit.

As best shown in FIGURE 3, valve body section 28 is provided with a transverse opening 109 coaxially receiving the inner end of bonnet 66 and exposing a portion of the outer periphery of sleeve 14 for engagement by closure member 80. Closure member 80 is coaxially received in bonnet 66 which has a smooth uniformly diametered internal cylindrical wall surface substantially concentric with surface 82 to guide axial movement of closure member 80. A small annular clearance is provided between bonnet 66 and closure member 80 allowing free axial movement of closure member 80 but, at the same time, confining member 80 against lateral movement or pivotal movement about an axis extending normal to the rotational axis of stem 72. This annular clearance between member 80 and bonnet 66 preferably is on the order of 3/100 of an inch.

When closure member 80 is moved to partially and fully valve closed positions, it projects into the space delimited by valve body 20 where it is subjected to the lateral application of line fluid pressure forces acting through sleeve 14. Such line fluid pressure forces being greater on the upstream side of closure member 80 particularly when member 80 is in or near fully closed position, act laterally on member 80 tending to push it toward the downstream side of the valve. As a result, stem 72 and closure member 80 will tend to pivot as a unit about an axis located in the region of boss 74 and extending normal to the rotational axis of the stem, thus tending to cant stem 72 relative to the longitudinal axis of boss 74. The canting of stem 72 undesirably promotes binding and galling of the stem threads as previously mentioned to require an increased amount of torque for axially advancing closure member 80.

To avoid the foregoing undesirable condition, the axial length of cylindrical surface 82 is made sufficiently long so that the upper portion of closure member 80 adjacent to the threaded portion of stem 72 is always disposed within the interior of and in guided relationship with bonnet 66 even when closure member 80 is in its fully closed position as shown in FIGURE 3. As a consequence, closure member 80 and stem 72 are confined as a unit against pivotal movement in any position and regardless of line fluid pressure forces acting on member 80.

In the fully valve opened position illustrated in FIGURE 1, the passageway 15 formed by sleeve 14 is straight and undeformed. By threadedly advancing valve stem 72 inwardly, the hemispherical surface 82 of closure member 80 engages the adjacent region of the exterior surface of sleeve 14 which is exposed through aperture 109 in valve body 20 to depress this portion of sleeve 14 radially inwardly. When closure member 80 abuttingly engages the exterior surface of sleeve 14, it will be restrained against rotation by the frictional force developed at the interface of valve closure member 80 and sleeve 14. Stem 72 being rotatable relative to closure member 80, however, is turned with relatively low application of torque to advance closure member 80 towards its fully closed position illustrated in FIGURE 3, thereby constricting sleeve 14 to throttle the flow of fluid through passageway 15. Since stem 72 is axially displaced as it is rotated and since closure member 80 is axially fixed in one position on stem 72, it is evident that the axial position of member 80 is readily determined by the axial length of stem 72 projecting beyond plate 68. As a result, throttling adjustments are easily and quickly approximated.

Thus, the threaded valve operator construction just described collectively provides for effective throttling control of the fluid flowing through sleeve passage 15, for self alignment of valve stem 72 with valve closure member 80, for low application of torque in advancing stem 72 regardless of the magnitude of line fluid pressure, and also for a rising operating stem structure carrying valve closure member 80, enabling the position of closure member 80 to be determined by the axial length of stem 72 projecting beyond cap 68. When sleeve 14 is constricted intermediate its end by closure member 80, it tends to slip axially inwardly. This axially slippage is prevented by the gripping engagement of end portions 42 and 44 augmented by the interlocking engagement of shoulders 63 and 64.

In the fully closed position of valve 10 shown in FIGURE 3, closure member 80 is advanced radially inwardly with respect to sleeve 14 sufficiently far to depress the adjacent region of sleeve 14 tightly against the diametrically opposite region of the sleeve and thereby establish a fluid tight seal. The inherent elasticity and large wall thickness of sleeve 14 enables the sleeve, without the assistance of internal line fluid pressure, to resume its undeformed shape shown in FIGURE 1 when closure member 80 is withdrawn to a position completely within bonnet 66 and radially beyond the interior wall surface of valve body 20.

With the shape of valve closure member 80 just described, the wall portion of sleeve 14 in contact with member 80 will roll under member 80 as it is advanced in constrict sleeve 14. In addition, passageway 15 will be constricted in direct proportion to the linear movement of closure member 80 since lateral movement of sleeve 14 is prevented by engagement with valve body 20 which completely encircles sleeve 14.

In the present invention, the diameter of closure member 80 is preferably made substantially equal to the inside diameter of sleeve 14 particularly for valve sizes up to 3 inches to assure a fluid tight seal when member 80 is in fully closed position. Sleeve 14 is formed with a thick annular wall to perfect a fluid tight closure and to provide maximum resistance to wear by abrasion or tear in addition to establishing a positive unassisted return of the sleeve to its undeformed tubular shape after closure member 80 is withdrawn. Preferably the thickness of sleeve 14 ranges from 0.63 inch for 1 inch valve to 1.190 inches for 4 inch valves. The inside diameter of sleeve 14 is made equal to that of the pipeline in which the valve is adapted to be connected to assure for smooth uninterrupted flow of fluid through the valve.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A valve comprising:
   (a) a rigid body,
   (b) an elastic tubular constrictor element encirclingly confined by said body and providing an unobstructed fluid passage therethrough,
   (c) means for transversely constricting said element intermediate the ends thereof to selectively vary the cross-section of said fluid passage, and
   (d) means securing the end region of said element in substantially axially fixed and fluid tight relation to said body comprising:
   (e) a rigid annulus removably mounted in each of said end regions substantially concentric with the longitudinal axis of said element to flare each end region radially outwardly, and
   (f) a plurality of radially inwardly directed closely axially spaced apart annular ridges formed on said body radially outwardly of each end region for grippingly engaging each of said end regions when flared by said annulus.

2. The valve defined in claim 1 wherein said body is provided at each end with an annular recess having an internal cylindrical wall surface in which said ridges are formed, and wherein each of said end regions of said element comprises a diametrically enlarged portion snugly and interfittingly received in said recess.

3. The valve defined in claim 2 wherein said body is formed at each end with an annular substantially radially extending shoulder delimiting said recess and interlockingly and matingly engaging a corresponding shoulder formed on said end portion.

4. A valve comprising:
   (a) a rigid body formed at each end with an annular recess;
   (b) an elastic thick walled sleeve encirclingly confined by said body providing an unobstructed fluid passage therethrough, and formed at each end with an enlarged end region and an annular axially outwardly opening groove;
   (c) a rigid retaining ring snugly received in said groove and flaring said enlarged end region outwardly into snug fluid tight abutment with said body;
   (d) said recess being formed with an internal cylindrical wall surface having a grooved serrated region comprising a plurality of radially inwardly extending annular ridges gripping said sleeve to prevent axial displacement thereof relative to said body;
   (e) a threaded valve operating stem extending transversely of said sleeve;
   (f) means fixed relative to said body and threadedly mounting said stem so that said stem is axially shiftable by rotation thereof toward and away from said sleeve;

(g) a valve closure member, and (h) means axially retaining said closure member on said stem but permitting said closure member to rotate relative thereto, said valve closure member being disposed to engage and constrict said sleeve intermediate its ends by axial movement of said stem to thereby vary the cross-section of said fluid passage;

(i) said closure member being formed with a central, axially outwardly opening bearing recess terminating at its inner end with a socket and interfittingly and coaxially receiving the end of said stem adjacent said sleeve for establishing alignment between said stem and said closure member, and (j) a thrust bearing seated in said socket and engaging the inner end of said stem received in said recess.

5. A valve comprising:

(a) a rigid body;

(b) an elastic thick walled sleeve encirclingly confined by said body and providing an unobstructed fluid passage therethrough, and (c) a threaded valve operating stem extending transversely of said sleeve;

(d) means fixed relative to said body and threadedly mounting said stem so that said stem is axially shiftable by rotation thereof toward and away from said sleeve;

(e) a valve closure member operable by said stem within said valve body and disposed to engage and constrict said sleeve intermediate its ends;

(f) an operating connection between said stem and member comprising an elongated socket in said member receiving said stem and a point contact means constituting the sole means for unilaterally transmitting axial thrust therebetween to move said closure member in the valve closing direction;

(g) and a further, loose coupling connection between said stem and member for preventing separation thereof during valve opening movement of said stem and member without interferring with the unilateral action of said thrust transmitting means.

6. A valve according to claim 5 wherein the point contact means for transmitting thrust from the stem to the closure member comprises a ball and a hemispherical surface on the thrust end of the stem.

7. A valve according to claim 5 wherein the loose coupling connection between the stem and member comprises an annular groove surrounding said stem and a screw threaded in said member and extending loosely into said groove perpendicularly to the groove forming parallel sidewalls adapted to abut said screw and thereby axially retain said closure member on said stem.

References Cited by the Examiner

UNITED STATES PATENTS

| 1,761,721 | 6/1930 | Gipe | 251—8 |
| 2,277,395 | 3/1942 | Franck | 251—331 X |
| 2,679,378 | 5/1954 | Uhler | 251—331 |
| 3,090,591 | 5/1963 | Clarkson | 251—5 |

FOREIGN PATENTS

| 110,107 | 1928 | Austria. |
| 68,948 | 7/1958 | France. |
| 1,023,320 | 1952 | France. |

WILLIAM F. O'DEA, *Primary Examiner.*

ISADOR WEIL, *Examiner.*

R. GERARD, *Assistant Examiner.*